(12) United States Patent
Ozawa et al.

(10) Patent No.: US 9,527,994 B2
(45) Date of Patent: Dec. 27, 2016

(54) METHACRYLIC RESIN COMPOSITION, RESIN MODIFIER, AND MOLDED ARTICLE

(75) Inventors: Hiroshi Ozawa, Tainai (JP); Toru Takahashi, Tainai (JP); Atsushi Matsumura, Tainai (JP); Kenichi Hamada, Chiyoda (JP); Yoshihiro Morishita, Tsukuba (JP); Toyoaki Kurihara, Chiyoda (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 13/881,310

(22) PCT Filed: Oct. 24, 2011

(86) PCT No.: PCT/JP2011/074434
§ 371 (c)(1),
(2), (4) Date: Apr. 24, 2013

(87) PCT Pub. No.: WO2012/057079
PCT Pub. Date: May 3, 2012

(65) Prior Publication Data
US 2013/0217827 A1    Aug. 22, 2013

(30) Foreign Application Priority Data
Oct. 29, 2010  (JP) ................................ 2010-244502

(51) Int. Cl.
| | | |
|---|---|---|
| *C08L 33/12* | (2006.01) | |
| *C08L 53/00* | (2006.01) | |
| *C08L 33/08* | (2006.01) | |
| *C08F 297/02* | (2006.01) | |
| *C08F 220/18* | (2006.01) | |

(52) U.S. Cl.
CPC ............ *C08L 53/00* (2013.01); *C08F 297/026* (2013.01); *C08L 33/08* (2013.01); *B29K 2233/12* (2013.01); *C08F 2220/185* (2013.01)

(58) Field of Classification Search
CPC ....... C08L 33/08; C08L 53/00; C08F 297/026; C08F 2220/1825
See application file for complete search history.

(56) References Cited

U.S. PATENT DOCUMENTS

| 5,264,527 A | 11/1993 | Varshney et al. |
|---|---|---|
| 6,121,371 A | 9/2000 | Matyjaszewski et al. |
| 6,329,480 B1 | 12/2001 | Uchiumi et al. |
| 6,989,190 B2 | 1/2006 | Gaggar et al. |
| 7,691,797 B2 | 4/2010 | Schmidt et al. |
| 8,268,928 B2 | 9/2012 | Oshima et al. |
| 2003/0139530 A1* | 7/2003 | Starita ........................ 525/240 |
| 2003/0191243 A1 | 10/2003 | Hamada et al. |
| 2005/0085592 A1 | 4/2005 | Taniguchi et al. |
| 2005/0272865 A1 | 12/2005 | Taniguchi et al. |
| 2006/0128892 A1 | 6/2006 | Hidalgo et al. |
| 2010/0063210 A1 | 3/2010 | Ozawa et al. |
| 2010/0190930 A1 | 7/2010 | Bourrigaud et al. |
| 2011/0021677 A1* | 1/2011 | Kwon et al. .................. 524/115 |
| 2011/0218303 A1* | 9/2011 | Oshima et al. ................ 525/94 |

FOREIGN PATENT DOCUMENTS

| EP | 2065442 A1 | 6/2009 |
|---|---|---|
| JP | 1-261447 A | 10/1989 |
| JP | 6-93060 A | 4/1994 |
| JP | 7-25859 B2 | 3/1995 |
| JP | 10-168271 A | 6/1998 |
| JP | 11-335432 A | 12/1999 |
| JP | 2000-154329 A | 6/2000 |
| JP | 2002-241568 A | 8/2002 |
| JP | 2003-277574 A | 10/2003 |
| JP | 2006-124724 A | 5/2006 |
| JP | 2007-512413 A | 5/2007 |
| JP | 2010-13613 | 1/2010 |
| JP | 2010-519360 | 6/2010 |
| JP | 2011-153243 A | 8/2011 |
| JP | 2015-166474 A | 9/2015 |
| WO | 99/50310 | 10/1999 |
| WO | WO 2009/054553 A2 | 4/2009 |
| WO | WO 2010/055798 A1 | 5/2010 |

OTHER PUBLICATIONS

English Translation of JP 01-261447.*
U.S. Appl. No. 13/819,859, filed Apr. 23, 2013, Miyake, et al.
International Search Report issued Dec. 6, 2011, in PCT/JP2011/074434.
Georges Moineau, et al., "Synthesis of fully acrylic thermoplastic elastomers by atom transfer radical polymerization (ATRP), $2^a$ Effect of the catalyst on the molecular control and the rheological properties of the triblock copolymers", Macromol. Chem. Phys., vol. 201, 2000, pp. 1108-1114.
Office Action issued Feb. 9, 2016, in Japanese Patent Application No. 2015-129816.
Extended European Search Report issued Oct. 21, 2015 in Application No. 11836213.6.
Office Action issued May 24, 2016 in Japanese Patent Application No. 2015-129817.

* cited by examiner

*Primary Examiner* — Mark Kaucher
(74) *Attorney, Agent, or Firm* — Oblon, McClelland, Maier & Neustadt, L.L.P.

(57) ABSTRACT

An object of the present invention is to provide a methacrylic resin composition which exhibits excellent flexibility, elasticity, impact resistance, and plasticity and moldability while transparency inherent to methacrylic resins is maintained. A methacrylic resin composition to be produced is composed of 10 to 99 parts by mass of a methacrylic resin (A) containing not less than 80 mass % of a methyl methacrylate unit and 90 to 1 part by mass of a block copolymer (B) containing 10 to 60 mass % of a methyl methacrylate polymer block (b1) and 90 to 40 mass % of an acrylate polymer block (b2) and having a refractive index of 1.485 to 1.495 (the total of (A) and (B) is 100 parts by mass).

10 Claims, No Drawings

METHACRYLIC RESIN COMPOSITION, RESIN MODIFIER, AND MOLDED ARTICLE

CROSS REFERENCE TO RELATED APPLICATIONS

The present application is a 35 U.S.C. §371 national stage patent application of International patent application PCT/JP11/074434, filed on Oct. 24, 2011, the text of which is incorporated by reference, and claims the benefit of the filing date of Japanese Patent Application No. 2010-244502, filed on Oct. 29, 2010, the text of which is also incorporated by reference.

TECHNICAL FIELD

The present invention relates to a methacrylic resin composition which exhibits high transparency, moldability, and mechanical properties.

BACKGROUND ART

Methacrylic resin has excellent optical characteristics, such as transparency, and weather resistance, and molded articles thereof have a beautiful appearance; thus, methacrylic resin has been traditionally used in a variety of applications such as illumination equipment, display devices such as signboards, optical members such as components of displays, interior appliances, building parts, electronic and electric parts, and medical equipment. In contrast, since methacrylic resin is a brittle material, it has been difficult to directly use methacrylic resin in applications requiring flexibility, elasticity, impact resistance, and plasticity.

A variety of approaches have been made to enhance the flexibility, elasticity, impact resistance, and plasticity of methacrylic resin.

Patent Literature 1 (Japanese Unexamined Patent Application Publication No. 10-168271), for example, discloses a resin composition, in which impact resistance is mainly enhanced as a result of mixing acrylic resin with a block copolymer containing a highly syndiotactic poly(alkyl methacrylate) block.

Patent Literature 2 (Japanese Unexamined Patent Application Publication No. 2000-154329) discloses a resin composition produced as a result of mixing acrylic resin with an impact resistance enhancer that is a block copolymer composed of a methacrylic polymer block and an acrylic polymer block.

Patent Literature 3 (Japanese Unexamined Patent Application Publication No. 2003-277574) discloses a resin composition which is produced as a result of mixing an acrylic thermoplastic elastomer with methacrylic resin and which exhibits weather resistance, plasticity, and mechanical properties in a well-balanced manner.

Patent Literature 4 (International Publication No. WO2010/055798) discloses a resin composition which is produced as a result of mixing acrylic resin with multiple acrylic block copolymers and which exhibits excellent transparency and moldability in a wide range of structures.

Patent Literature 5 (Japanese Unexamined Patent Application Publication No. 2006-124724) discloses a resin composition which is produced as a result of adding a block copolymer containing an acrylic polymer block to a thermoplastic resin for dynamic crosslinking and which exhibits excellent thermal resistance and oil resistance.

Each approach, however, cannot provide sufficient transparency; hence, development of a resin composition not only exhibiting flexibility, elasticity, impact resistance, and plasticity but also exhibiting excellent melt flowability and injection moldability while transparency inherent to methacrylic resins is maintained has been demanded.

CITATION LIST

Patent Literatures

PTL 1: Japanese Unexamined Patent Application Publication No. 10-168271
PTL 2: Japanese Unexamined Patent Application Publication No. 2000-154329
PTL 3: Japanese Unexamined Patent Application Publication No. 2003-277574
PTL 4: International Publication No. WO2010/055798
PTL 5: Japanese Unexamined Patent Application Publication No. 2006-124724

SUMMARY OF INVENTION

Problems to be Solved by the Invention

It is an object of the present invention to provide a methacrylic resin composition not only exhibiting flexibility, elasticity, impact resistance, and plasticity but also exhibiting excellent melt flowability and injection moldability while transparency inherent to methacrylic resins is maintained.

Means for Solving the Problems

The inventors have been intensively studied to accomplish the object described above. The inventors have finally found that a resin composition which is composed of a methacrylic resin and a block copolymer containing predetermined polymer blocks and having a predetermined refractive index can exhibit flexibility, elasticity, impact resistance, and plasticity while transparency inherent to methacrylic resins is maintained.

In particular, the methacrylic resin composition of the present invention is composed of 10 to 99 parts by mass of a methacrylic resin (A) containing not less than 80 mass % of a methyl methacrylate unit and 90 to 1 part by mass of a block copolymer (B) containing 10 to 60 mass % of a methyl methacrylate polymer block (b1) and 90 to 40 mass % of an acrylate polymer block (b2) and having a refractive index of 1.485 to 1.495 (the total of (A) and (B) is 100 parts by mass).

It is preferred that the acrylate polymer block (b2) contained in the block copolymer (B) be a copolymer block composed of 50 to 90 mass % of an alkyl acrylate and 50 to 10 mass % of an aromatic (meth)acrylate. A preferred aromatic (meth)acrylate is benzyl acrylate.

A resin modifier of the present invention is composed of the block copolymer (B).

A molded article of the present invention can be produced from the above-mentioned resin composition. A molded article produced from the above-mentioned methacrylic resin composition and having a thickness of 3 mm preferably exhibits a haze of not more than 2%.

Advantages

The resin composition of the present invention maintains transparency inherent to methacrylic resins and exhibits excellent flexibility, elasticity, impact resistance, and plasticity and melt flowability and injection moldability.

DESCRIPTION OF EMBODIMENTS

The present invention will now be described in detail.

The methacrylic resin (A) used in the present invention is a resin primarily composed of a methyl methacrylate unit and contains not less than 80 mass % of the methyl methacrylate unit. The methacrylic resin (A) preferably contains not less than 90 mass % of the methyl methacrylate unit, and more preferably not less than 95 mass %.

The methacrylic resin (A) may contain any monomer unit other than the methyl methacrylate unit. Examples of the monomer include methacrylates other than methyl methacrylate, such as ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate, glycidyl methacrylate, and allyl methacrylate; acrylates such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate;

unsaturated carboxylic acids such as acrylic acid, and maleic anhydride;

olefins such as ethylene, propylene, 1-butene, isobutylene, and 1-octene;

conjugated dienes such as 1,3-butadiene, isoprene, and myrcene;

aromatic vinyls such as styrene, α-methyl styrene, p-methyl styrene, and m-methyl styrene; and acrylamide, methacrylamide, acrylonitrile, methacrylonitrile, vinyl acetate, vinylpyridine, vinyl ketone, vinyl chloride, vinylidene chloride, and vinylidene fluoride. These monomers may be used alone or in combination.

In the case where the methacrylic resin (A) is a copolymer, the copolymer may have any structure and may be a random copolymer, a block copolymer, a graft copolymer, or an alternating copolymer. The methacrylic resin (A) used in the present invention may have any tacticity; for example, it may have an isotactic, heterotactic, or syndiotactic structure.

The methacrylic resin (A) may have any number-average molecular weight: normally in the range of 5000 to 2000000, and preferably 10000 to 1000000. The number-average molecular weight is a polystyrene equivalent number-average molecular weight determined by gel permeation chromatography (GPC).

The methacrylic resin (A) may be used alone or may be a mixture of two or more methacrylic resins, for instance, having different molecular weights.

The block copolymer (B) used in the present invention is composed of a methyl methacrylate polymer block (b1) and an acrylate polymer block (b2).

The methyl methacrylate polymer block (b1) is a polymer block primarily composed of methyl methacrylate units and contains normally not less than 50 mass % of the methyl methacrylate units, preferably 60 to 100 mass %, more preferably 90 to 100 mass %, further preferably 95 to 100 mass %, still further preferably 98 to 100 mass %, and even preferably 100 mass %.

The methyl methacrylate polymer block (b1) may contain any monomer unit other than the methyl methacrylate unit. Examples of monomers which can serve as such a monomer unit include methacrylates other than methyl methacrylate, acrylates, unsaturated carboxylic acids, olefins, conjugated dienes, aromatic vinyls, acrylamide, methacrylamide, acrylonitrile, methacrylonitrile, vinyl acetate, vinylpyridine, vinyl ketone, vinyl chloride, vinylidene chloride, and vinylidene fluoride, each having been mentioned in the description of the methacrylic resin (A).

In the case where a methacrylate other than methyl methacrylate or an acrylate is used as the monomer, an aromatic methacrylate such as phenyl methacrylate, benzyl methacrylate, or phenoxyethyl methacrylate is preferably used; and an aromatic acrylate such as phenyl acrylate, benzyl acrylate, or phenoxyethyl acrylate is preferably used, these methacrylate and acrylate being capable of enhancing the compatibility of the methyl methacrylate polymer block (b1) with the methacrylic resin (A) and increasing transparency while flexibility, elasticity, impact resistance, and plasticity are maintained. Such a methacrylate other than methyl methacrylate or such an acrylate, typically, an aromatic methacrylate and an aromatic acrylate are desirably not contained in excessive amounts, and their contents are preferably not more than 10 mass %, and more preferably not more than 5 mass % relative to monomers constituting the methyl methacrylate polymer block (b1).

The monomer composition is preferably adjusted such that a polymer composed of only the monomer constituting the methyl methacrylate polymer block (b1) has a refractive index ranging from 1.485 to 1.495.

The acrylate polymer block (b2) is a polymer block primarily composed of acrylate units and normally contains not less than 50 mass %, preferably 60 to 100 mass %, and more preferably 80 to 100 mass % of the acrylate units.

Examples of the acrylate include alkyl acrylates such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, and isobornyl acrylate; aromatic acrylates such as phenyl acrylate, benzyl acrylate, and phenoxyethyl acrylate; and 2-hydroxyethyl acrylate, 2-methoxyethyl acrylate, glycidyl acrylate, and allyl acrylate.

Among these acrylates, alkyl acrylates, aromatic acrylates, and 2-methoxyethyl acrylate are preferred; methyl acrylate, ethyl acrylate, isopropyl acrylate, n-butyl acrylate, 2-ethylhexyl acrylate, dodecyl acrylate, benzyl acrylate, and 2-methoxyethyl acrylate are more preferred; and n-butyl acrylate and 2-ethylhexyl acrylate are further preferred. Use of these acrylates is likely to further enhance the flexibility, elasticity, impact resistance, and plasticity of the resin composition of the present invention.

The acrylate polymer block (b2) may contain any monomer unit other than the acrylate unit. Examples of monomers which can serve as such a monomer unit include methyl methacrylate and the above-mentioned methacrylates, unsaturated carboxylic acids, olefins, conjugated dienes, aromatic vinyls, acrylamide, methacrylamide, acrylonitrile, methacrylonitrile, vinyl acetate, vinylpyridine, vinyl ketone, vinyl chloride, vinylidene chloride, and vinylidene fluoride.

Among these, aromatic methacrylates such as phenyl methacrylate, benzyl methacrylate, and phenoxyethyl methacrylate are preferred.

The acrylate polymer block (b2) is preferably a copolymer block composed of the above-mentioned alkyl acrylate and an aromatic (meth)acrylate, which enables the block copolymer (B) to have a refractive index within a preferred range.

The term "aromatic (meth)acrylate" herein collectively means aromatic acrylates and aromatic methacrylates. Among the above-mentioned aromatic acrylates and aromatic methacrylates, the aromatic (meth)acrylate that is copolymerized with an alkyl acrylate is preferably benzyl acrylate which enables the resin composition of the present invention to exhibit excellent flexibility, elasticity, impact resistance, and plasticity and imparts satisfactory transparency to the resin composition.

The alkyl acrylate unit content in the copolymer block is preferably in the range of 50 to 90 mass %, and more preferably 60 to 80 mass %. The aromatic (meth)acrylate unit content in the copolymer block is preferably in the range of 50 to 10 mass %, and more preferably 40 to 20 mass %. The alkyl acrylate unit and aromatic (meth)acrylate unit contained in the copolymer block within the range are likely to enhance the transparency of the resin composition of the present invention.

The monomer composition is preferably adjusted such that a polymer composed of only the monomer constituting the acrylate polymer block (b2) has a refractive index ranging from 1.485 to 1.495.

The methyl methacrylate polymer block (b1) content in the block copolymer (B) is in the range of 10 to 60 mass %, and preferably 20 to 55 mass %. The (b1) content within the range contributes to providing flexibility, elasticity, impact resistance, and plasticity without impairing the transparency of the methacrylic resin (A). In the case where the block copolymer (B) contains multiple methyl methacrylate polymer blocks (b1), the above-mentioned content is the total content of all methyl methacrylate polymer blocks (b1).

The acrylate polymer block (b2) content in the block copolymer (B) is in the range of 90 to 40 mass %, and preferably 80 to 45 mass %. With the (b2) content within these ranges, the resin composition of the present invention is likely to exhibit excellent impact resistance and plasticity. In the case where the block copolymer (B) contains multiple acrylate polymer blocks (b2), the above-mentioned content is the total content of all acrylate polymer blocks (b2).

The block copolymer (B) has a refractive index ranging from 1.485 to 1.495. At a refractive index within such a range, the resin composition can be produced so as to have excellent flexibility, elasticity, impact resistance, and plasticity while transparency inherent to methacrylic resins is maintained.

The refractive index of the block copolymer (B) is preferably in the range of 1.486 to 1.494, and more preferably 1.487 to 1.494. At a refractive index within the range, a resin composition to be produced can exhibit excellent flexibility, elasticity, impact resistance, and plasticity as well as having high transparency.

Examples of the bonding structure of the block copolymer include, but are not limited to, diblock copolymers represented by [methyl methacrylate polymer block (b1)]-[acrylate polymer block (b2)];

triblock copolymers represented by [methyl methacrylate polymer block (b1)]-[acrylate polymer block (b2)]-[methyl methacrylate polymer block (b1)] and [acrylate polymer block (b2)]-[methyl methacrylate polymer block (b1)]-[acrylate polymer block (b2)];

multiblock copolymers having four or more polymer blocks, such as [methyl methacrylate polymer block (b1)]-([acrylate polymer block (b2)]-[methyl methacrylate polymer block (b1)])$_{n+1}$, [methyl methacrylate polymer block (b1)]-([acrylate polymer block (b2)]-[methyl methacrylate polymer block (b1)])$_n$-[acrylate polymer block (b2)], [acrylate polymer block (b2)]-([methyl methacrylate polymer block (b1)]-[acrylate polymer block (b2)])$_{n+1}$, and [acrylate polymer block (b2)]-([methyl methacrylate polymer block (b1)]-[acrylate polymer block (b2)])$_n$-[methyl methacrylate polymer block (b1)](n is an integer greater than or equal to 1); and star block copolymers represented by ([methyl methacrylate polymer block (b1)]-[acrylate polymer block (b2)])$_m$ X, ([acrylate polymer block (b2)]-[methyl methacrylate polymer block (b1)])$_m$X, and ([methyl methacrylate polymer block (b1)]-[acrylate polymer block (b2)]-[methyl methacrylate polymer block (b1)])$_m$ X (m is a positive value larger than 2 on average, and X represents a coupling residue).

Among these, diblock copolymers, triblock copolymers, and star block copolymers are preferred; diblock copolymers represented by [methyl methacrylate polymer block (b1)]-[acrylate polymer block (b2)], triblock copolymers represented by [methyl methacrylate polymer block (b1)]-[acrylate polymer block (b2)]-[methyl methacrylate polymer block (b1)], and star block copolymers represented by ([methyl methacrylate polymer block (b1)]-[acrylate polymer block (b2)])$_m$X or ([methyl methacrylate polymer block (b1)]-[acrylate polymer block (b2)]-[methyl methacrylate polymer block (b1)])$_m$X are more preferred (m is a positive value larger than 2 on average, and X represents a coupling residue).

The block copolymer (B) composed of the methyl methacrylate polymer block (b1) and the acrylate polymer block (b2) may contain a polymer block (c) containing a monomer unit different from a monomer mainly composed of an acrylate or a methyl methacrylate without impairing the effect of the present invention.

Examples of monomers which can constitute the polymer block (c) include unsaturated carboxylic acids, olefins, conjugated dienes, aromatic vinyls, acrylamide, methacrylamide, acrylonitrile, methacrylonitrile, vinyl acetate, vinylpyridine, vinyl ketone, vinyl chloride, vinylidene chloride, vinylidene fluoride, $\epsilon$-caprolactone, and valerolactone.

In the case where the block copolymer (B) contains the polymer block (c), examples of its bonding structure include [methyl methacrylate polymer block (b1)]-([acrylate polymer block (b2)]-[methyl methacrylate polymer block (b2)])$_n$-[polymer block (c)] and [polymer block (c)]-[methyl methacrylate polymer block (b1)]-([acrylate polymer block (b2)]-[methyl methacrylate polymer block (b1)])$_n$-[polymer block (c)] (n is an integer greater than or equal to 1).

The block copolymer (B) may have any molecular chain structure: for example, a linear, branched, or radial structure. The block copolymer (B) may have any number-average molecular weight: normally in the range of 10000 to 1000000, preferably 20000 to 400000, more preferably 20000 to 200000, further preferably 30000 to 200000, and especially preferably 30000 to 100000. If the block copolymer (B) has a number-average molecular weight below the range, flexibility, elasticity, and impact resistance cannot be sufficiently enhanced; if the block copolymer (B) has a number-average molecular weight above the range, melt flowability and injection moldability are degraded.

In order to prevent degradation in the transparency of a resin composition to be produced, the block copolymer (B) has a molecular weight distribution (Mw/Mn) that is preferably in the range of 1.0 to 2.0, and more preferably 1.0 to 1.6.

The block copolymer (B) may be produced through any procedure, and a preferred procedure is living polymerization of monomers constituting individual polymer blocks. Examples of techniques for such living polymerization include a technique involving use of an organoalkali metal compound as a polymerization initiator and anionic polymerization in the presence of mineral acid salts such as salts of alkali metal or alkaline earth metal (see Japanese Examined Patent Application Publication No. 7-25859), a technique involving use of an organoalkali metal compound as a polymerization initiator and anionic polymerization in the presence of an organoaluminum compound (see Japanese Unexamined Patent Application Publication No. 11-335432), a technique involving use of organometallic complex of rare earth elements as a polymerization initiator (see Japanese Unexamined Patent Application Publication No. 6-93060), a technique involving use of an α-halogenated ester compound as an initiator and radical polymerization in the presence of a copper compound (see *Macromol. Chem. Phys.*, vol. 201, 1108-1114 (2000)), and a technique involving controlled radical polymerization in the presence of a nitroxide compound (see Japanese Unexamined Patent Application Publication (Translation of PCT Application) No. 2007-512413). In addition, monomers constituting individual blocks may be polymerized with the aid of a polyvalent radical polymerization initiator or a polyvalent radical chain transfer agent to produce a mixture containing the block copolymer (B). Among these techniques, a technique involving use of an organoalkali metal compound as a polymerization initiator and anionic polymerization in the presence of an organoaluminum compound is preferred, which enables production of a high-purity block copolymer and provides narrow molecular-weight distribution, in other words, which excludes an oligomer which degrades the paintability and oil resistance of a polymeric composition and a high-molecular-weight product which degrades the flexibility of the composition. Typical examples of the organoaluminum compound include isobutylbis(2,6-di-t-butyl-4-methylphenoxy)aluminum, isobutylbis(2,6-di-t-butylphenoxy)aluminum, isobutylbis[2,2'-methylenebis(4-methyl-6-t-butylphenoxy)]aluminum, n-octylbis(2,6-di-t-butyl-4-methylphenoxy)aluminum, n-octylbis(2,6-di-t-butylphenoxy)aluminum, n-octylbis[2,2'-methylenebis(4-methyl-6-t-butylphenoxy)]aluminum, tris(2,6-di-t-butyl-4-methylphenoxy)aluminum, and tris(2,6-diphenylphenoxy)aluminum. Among these, isobutylbis(2,6-di-t-butyl-4-methylphenoxy)aluminum, isobutylbis(2,4-di-t-butylphenoxy)aluminum, n-octylbis(2,6-di-t-butyl-4-methylphenoxy)aluminum, and n-octylbis (2,4-di-t-butylphenoxy) aluminum are preferred in view of polymerization activity and block efficiency.

The block copolymer (B) can be suitably used as a resin modifier. In particular, even if the methacrylic resin (A) and the block copolymer (B) are blended at any composition ratio, the methacrylic resin composition of the present invention can provide high transparency and excellent flexibility, elasticity, impact resistance, and plasticity.

The methacrylic resin composition of the present invention contains 10 to 99 parts by mass of the methacrylic resin (A) and 90 to 1 part by mass of the block copolymer (B), preferably 15 to 99 parts by mass of the methacrylic resin (A) and 85 to 1 part by mass of the block copolymer (B), and more preferably 20 to 99 parts by mass of the methacrylic resin (A) and 80 to 1 part by mass of the block copolymer (B) (the total of (A) and (B) is 100 parts by mass).

The properties of the resin composition can be appropriately adjusted on the basis of the acrylate polymer block (b1) content in the block copolymer (B) or a phase formed from the methacrylic resin (A) in the composition, such as a matrix phase or a dispersion phase.

In the case where the acrylate polymer block (b2) content in the block copolymer (B) is high relative to the whole methacrylic resin composition and where the methacrylic resin (A) is in a dispersion phase, for instance, a soft acrylic material exhibiting high plasticity can be produced. Although the composition of the soft acrylic material exhibiting such a property varies depending on the molecular structure and type of the block copolymer (B) and the molecular structure of the methacrylic resin (A), the acrylate polymer block (b2) content is normally in the range of 25 to 75 mass %, and preferably 30 to 60 mass % relative to the whole methacrylic resin composition.

The methacrylic resin (A) being in a dispersion phase may have a spherical form, a cylindrical form, or a lamellar form. The dispersion size of the methacrylic resin (A) preferably ranges from 10 nm to 1 μm, more preferably 20 to 700 nm, and further preferably 50 to 300 nm. The term "dispersion size" herein refers to the diameter of a dispersing element having a spherical or cylindrical form and refers to the size of a dispersing element having a lamellar form in its thickness direction.

In the case where multiple block copolymers (B) having different compositions are used, the acrylate polymer block (b2) content is in the range of 30 to 40 mass % relative to the whole methacrylic resin composition, which enables production of soft acrylic resin. The multiple block copolymers (B) having different compositions are preferably used in a combination that provides good compatibility with and dispersibility in the methacrylic resin (A), and at least one of the multiple block copolymers (B) preferably contains the methyl methacrylate polymer block (b1) having a long molecular chain; such a methyl methacrylate polymer block (b1) has a number-average molecular weight preferably ranging from approximately 15000 to 100000, and more preferably from approximately 20000 to 60000.

Soft acrylic resin has high plasticity and excellent optical characteristics such as transparency and can be therefore utilized in television sets, monitors of personal computers, displays of cellular phones, portable terminals, optical films for advertisement, and light guides of light sources such as an LED.

In the case where the acrylate polymer block (b2) content in the block copolymer (B) is low relative to the whole methacrylic resin composition and where the methacrylic resin (A) is in a matrix phase, a hard acrylic material can be produced, the hard acrylic material exhibiting excellent flexibility, elasticity, or impact resistance while the hardness (elastic modulus and surface hardness) and optical transparency of methacrylic resin are secured.

In the case where the methacrylic resin (A) is in a matrix phase, it is preferred that the methacrylic resin (A) exhibit compatibility with the methyl methacrylate polymer block (b1) contained in the block copolymer (B) and that the acrylate polymer block (b2) contained in the block copolymer (B) be in a dispersion phase. In this case, the acrylate polymer block (b2) being in a dispersion phase preferably has various forms such as a spherical form, a cylindrical form, and a lamellar form. Depending on the molecular weight of the acrylate polymer block, the dispersion size is preferably in the range of 5 to 100 nm, more preferably 19 to 50 nm. The term "dispersion size" herein refers to the diameter of a dispersing element having a spherical or cylindrical form and refers to the size of a dispersing element having a lamellar form in its thickness direction.

Although the composition of the hard acrylic material exhibiting such properties varies on the basis of the molecular structure and type of the block copolymer (B) and the molecular structure of the methacrylic resin (A), the acrylate polymer block (b2) content normally ranges from 3 to 40 mass %, preferably from 3 to 30 mass %, further preferably from 5 to 30 mass %, and even further preferably from 5 to 20 mass % relative to the whole methacrylic resin composition. If the acrylate polymer block (b2) content is not less than the lower limit of the range, excellent impact resistance and melt flowability can be provided; if the acrylate polymer block (b2) content is not more than the upper limit of the range, excellent rigidity and scratch resistance can be provided.

In order to produce the hard acrylic material having such properties, a methacrylic resin composition is generally produced as a result of blending an acrylic rubber component, which is a multilayered graft copolymer produced through emulsion polymerization or another process, with a methacrylic resin. In the methacrylic resin composition produced in this manner, difficulty arises in inhibition of foreign matter defects caused by coagulation or the like of the rubber component, and the dispersion size of the rubber component of normally not less than 100 nm makes it difficult to produce an optically transparent material. In addition, since a cross-linked rubber is used as the rubber to be blended, melt flowability tends to be decreased.

Modification of methacrylic resin by addition of a traditional acrylic block copolymer significantly impairs transparency even in the case where the acrylate polymer block content in the acrylic block copolymer is not more than 20 mass % relative to the whole resin composition.

In contrast, in the methacrylic resin composition of the present invention in which the block copolymer (B) is added to the methacrylic resin (A), transparency inherent to the methacrylic resin (A) is not impaired, and excellent melt flowability is exhibited during injection molding. Although melt flowability is not specifically limited, a melt flow rate (MFR) is preferably not less than 20 g/10 min, more preferably not less than 25 g/10 min at 230° C. and 37.3 N in accordance with ISO 1133.

Such a resin composition exhibiting melt flowability and impact resistance in a well-balanced manner enables enhancement in moldability in large-scale injection molding and injection molding which involves transfer of fine patterns; thus, such a resin composition is suitably used for interior materials and exterior materials of automobiles, housings of electric products, light guide panels, sheets of solar cells, window films, and patterned optical films for surfaces of flat panel displays such as an LCD.

The methacrylic resin composition may optionally contain any polymer other than the methacrylic resin (A) and the block copolymer (B) without impairing the effect of the present invention. Examples of such a polymer include olefin resins such as polyethylene, polypropylene, polybutene-1, poly-4-methylpentene-1, and polynorbornene; ethylene ionomers; styrene resins such as polystyrene, styrene-maleic anhydride copolymers, high impact polystyrene, AS resin, ABS resin, AES resin, AAS resin, ACS resin, and MBS resin; methyl methacrylate-styrene copolymers; polyester resins such as polyethylene terephthalate and polybutylene terephthalate; polyamides such as nylon 6, nylon 66, and polyamide elastomers; polycarbonates; polyvinyl chloride; polyvinylidene chloride; polyvinyl alcohol; ethylene-vinyl alcohol copolymers; polyacetals; polyvinylidene fluoride; polyurethane; modified polyphenylene ethers; polyphenylene sulfide; and silicone rubber-modified resins.

The methacrylic resin composition of the present invention may contain additives such as rubber, a softener, a lubricant, a plasticizer, an adhesive, a tackifier, an antioxidant, a thermal stabilizer, a photostabilizer, an antistatic agent, a flame retardant, a foaming agent, a colorant, and a dye; and fillers such as an inorganic filler and a fibrous reinforcing agent without impairing the effect of the present invention.

Examples of the above-mentioned rubber include acrylic rubber; silicone rubber; styrene-based thermoplastic elastomers (TPEs) such as SEPS, SEBS, and SIS; and olefin rubbers such as IR, EPR, and EPDM.

Examples of the above-mentioned softener include mineral oil softeners such as paraffin oil and naphthene oil. Addition of the softener enhances flowability during a molding process.

Examples of the above-mentioned inorganic filler include calcium carbonate, talc, carbon black, titanium oxide, silica, clay, barium sulfate, and magnesium carbonate. Addition of the inorganic filler enhances thermal resistance and weather resistance and increases a yield of the composition.

Examples of the above-mentioned fibrous reinforcing agent include inorganic fibers, such as glass fibers and carbon fibers, and organic fibers. Addition of the fibrous reinforcing agent reinforces the composition.

Among these additives, a thermal stabilizer and an antioxidant are practically preferred in view of further enhancements in thermal resistance and weather resistance.

The methacrylic resin composition of the present invention may be produced by any method and preferably produced by melt-kneading of the methacrylic resin (A) with the block copolymer (B) in view of an enhancement in the dispersibility of each component contained in the resin composition.

In particular, the methacrylic resin (A) and the block copolymer (B) may be put into a melt-kneading machine and then kneaded in a melted state. The above-mentioned other polymers, additives, and fillers may be optionally added at the same time as the addition of the components (A) and (B) and then melt-kneaded; alternatively, the block copolymer (B) may be melt-kneaded with the above-mentioned other polymers, additives, and fillers and then melt-kneaded with the methacrylic resin (A). Examples of the kneading machine to be used include a kneader-ruder, an extruder, a mixing roll, and a Banbury mixer. Temperature during the kneading may be appropriately adjusted depending on the melting temperatures or the like of the methacrylic resin (A), block copolymer (B), and another component to be used, and the kneading is carried out generally in a temperature range of 110 to 300° C.

The methacrylic resin composition of the present invention can be also produced through the following process to enhance transparency, dispersibility, and another property.

In particular, the block copolymer (B) is melted in a monomer mixture (A') containing not less than 80 mass % of a methyl methacrylate, and then the monomer mixture (A') containing the block copolymer (B) is subjected to polymerization to produce the resin composition of the present invention. The polymerization of the monomer mixture (A') in such a production process may be bulk polymerization without a solvent or solution polymerization with a solvent. Any solvent which can dissolve the monomer mixture (A'), the methacrylic resin (A) to be produced, and the block copolymer (B) can be used in solution polymerization; examples of such a solvent include aromatic hydrocarbons such as benzene, toluene, and ethyl benzene. Two or more solvents may be optionally used in combination. As compared with the melt-kneading with a melt extruder, such a production process shortens thermal history and thus reduces discoloration and the intrusion of foreign substances due to pyrolysis; in addition, the production process can enhance the dispersibility of the methacrylic resin (A) and block copolymer (B), leading to an enhancement in transparency.

The methacrylic resin composition of the present invention produced in this manner may have a desired form such as pellets or powder.

The polymeric composition that is in the form of pellets or powder can be suitably used as a molding material.

The methacrylic resin composition of the present invention exhibits excellent melt flowability and can be therefore molded using a molding technique and molding apparatus which are generally employed for thermoplastic polymers. Examples of a technique for producing a molded article include molding techniques involving thermal fusion (e.g., injection molding, extrusion molding, compression molding, blow molding, calendering, and vacuum molding); and solvent casting.

These molding techniques enable production of molded articles having predetermined shapes, such as molded products, pipes, sheets, films, fibrous products, or laminates including layers of the polymer composition.

The molded article made from the methacrylic resin composition of the present invention exhibits excellent transparency and impact resistance; for instance, a molded article having a thickness of 3 mm (typically, sheet-shaped molded article) has a haze of preferably not more than 2%, more preferably not more than 1.5%, and further preferably not more than 1%.

Impact resistance that is Charpy impact strength with an unnotched test specimen in accordance with ISO179-1eU is preferably not less than 21 kJ/m$^2$.

The molded article made from the methacrylic resin composition of the present invention exhibits excellent plasticity, flexibility, elasticity, and impact resistance and has high mechanical strength and weather resistance.

Hence, such a molded article can be used in a variety of applications including applications for food packages such as a food packaging film and a cap liner; applications for everyday sundries; applications for products related to sports, such as ski boots; applications for sporting products and toys, such as the outer coat and core material of a golf ball; applications for stationery such as a desk mat; applications for interior and exterior products of automobiles such as a bumper cover; applications for civil engineering and construction, such as a civil engineering sheet, a waterproof sheet, a sealing material for a window frame, and a sealing material for a building; applications for electrical equipment such as a bumper provided to the corners of a vacuum cleaner and a refrigerator door seal; applications for AV equipment; applications for OA equipment; applications for products related to footwear and clothing, such as a shoe sole and a top lift; applications for textiles; and applications for medical equipment.

EXAMPLES

The present invention will now be further specifically described with reference to Examples but should not be limited to Examples described below.

Measuring equipment and measurement techniques used in Examples and Comparative Examples were as follows.

(1) Measurement of Number-average Molecular Weight (Mn) and Molecular Weight Dispersion (Mw/Mn) of Block Copolymer by Gel Permeation Chromatography (GPC)

Equipment: gel permeation chromatograph (HLC-8020) manufactured by TOSOH CORPORATION Column: TSKgels GMHXL, G4000HXL, and G5000HXL (manufactured by TOSOH CORPORATION) connected in series Eluent: tetrahydrofuran Flow rate of eluent: 1.0 ml/min Column temperature: 40° C.

Detection: differential refractive index (R1) detector

Calibration curve: based on standard polystyrene (2) Analysis of Molecular Structure of Block Copolymer by Nuclear Magnetic Resonance Spectrum ($^1$H-NMR Spectrum)

Equipment: nuclear magnetic resonance apparatus "JNM-LA400" manufactured by JEOL Ltd.

Deuterated solvent: deuterated chloroform (3) Measurement of Refractive Index of Block Copolymer Equipment: "KPR-20" manufactured by Kalnew Co., Ltd Measurement wavelength: 587.6 nm (d line)

(4) Evaluation of Transparency of Methacrylic Resin Composition

The haze of a sheet having a thickness of 3 mm was measured in accordance with ISO 14782.

(5) Evaluation of Impact Resistance of Methacrylic Resin Composition

Charpy impact strength was measured with an unnotched test specimen in accordance with ISO179-1eU.

(6) Evaluation of Elastic Modulus

Measurement was carried out in accordance with ISO 178.

(7) Evaluation of Tensile Elongation at Break of Methacrylic Resin Composition

Both tensile elongation at break and tensile elasticity were measured in accordance with ISO 527-1 (JIS K 7161) being the general principle of a tension test.

(8) Melt-kneading of Methacrylic Resin Composition

Kneading was carried out with a LABO PLASTOMILL/R60 mixer (manufactured by Toyo Seiki Seisaku-sho, Ltd.) at 230° C. and 70 rpm for 3 minutes.

(9) Melt Flow Rate

A melt flow rate (MFR) was measured at 230° C. and 37.3 N in accordance with ISO 1173.

(10) Press Molding of Methacrylic Resin

Press molding was carried out with a hydraulic molding machine (manufactured by Toho Machinery Co., Ltd.) at 230° C.

(11) Injection Molding of Methacrylic Resin

An injection molding machine 75SAV (manufactured by The Japan Steel Works, LTD.) was used to produce specimens for testing physical properties at a cylinder temperature of 200° C. and a mold temperature of 60° C.

Example 1

Production of Block Copolymer B-1

(1) A three-neck flask (1 L) provided with a three-way cock was degased and purged with nitrogen. Toluene (776 ml), 1,2-dimethoxyethane (46.0 ml), and a toluene solution (19.6 ml) containing isobutylbis(2,6-di-t-butyl-4-methylphenoxy)aluminum (8.8 mmol) were put into the flask at room temperature, and then sec-butyllithium (1.8 mmol) was further added thereto. Methyl methacrylate (45.3 ml) was added to the mixture to promote a reaction at room temperature for an hour. The internal temperature of the resulting polymer solution was decreased to −15° C., and a liquid mixture of n-butyl acrylate (53.9 ml) and benzyl acrylate (11.3 ml) was added dropwise thereto for an hour. Methyl methacrylate (18.8 ml) was subsequently added to the product, and then the reaction liquid was heated to room temperature and stirred for 5 hours. The reaction liquid was poured into a large volume of methanol, and the generated precipitate was collected to yield an acrylic block copolymer B-1.

(2) The precipitate produced in the procedure (1) was subjected to analyses by GPC and $^1$H-NMR to determine a number-average molecular weight (Mn), molecular weight dispersion (Mw/Mn), and a mass ratio of a polymethyl methacrylate (PMMA) block to a copolymer block of n-butyl acrylate and benzyl acrylate (PnBA-co-PBzA).

(3) The acrylic block copolymer B-1 produced in the procedure (1) was dried with a vacuum drier at 80° C. for 12 hours and then thermally pressed into a molded article having a thickness of 3 mm. Then, the molded article was subjected to measurement of a refractive index. Results of the evaluation are shown in Table 1.

Example 2

Production of Block Copolymer B-2

(1) An acrylic block copolymer B-2 was prepared as in Example 1 except that n-butyl acrylate and benzyl acrylate were added in amounts of 50.5 ml and 14.2 ml, respectively. Results of the evaluation are shown in Table 1.

Example 3

Production of Block Copolymer B-3

(1) An acrylic block copolymer B-3 was prepared as in Example 1 except that n-butyl acrylate and benzyl acrylate were added in amounts of 47.1 ml and 17.0 ml, respectively. Results of the evaluation are shown in Table 1.

Example 4

Production of Acrylic Block Copolymer B-4

(1) A three-neck flask (1 L) provided with a three-way cock was degased and purged with nitrogen. Toluene (776 ml), 1,2-dimethoxyethane (46.0 ml), and a toluene solution (21.0 ml) containing isobutylbis(2,6-di-t-butyl-4-methylphenoxy)aluminum (9.4 mmol) were put into the flask at room temperature, and then sec-butyllithium (1.9 mmol) was further added thereto. Methyl methacrylate (19.2 ml) was added to the mixture to promote a reaction at room temperature for an hour. The internal temperature of the resulting polymer solution was decreased to −15° C., and a liquid mixture of n-butyl acrylate (66.0 ml) and benzyl acrylate (23.8 ml) was added dropwise thereto for an hour. Methyl methacrylate (19.2 ml) was subsequently added to the product, and then the reaction liquid was heated to room temperature and stirred for 5 hours. The reaction liquid was poured into a large volume of methanol, and the generated precipitate was collected to yield an acrylic block copolymer B-4. Results of the evaluation are shown in Table 1.

Comparative Example 1

Production of Acrylic Block Copolymer B-5

(1) An acrylic block copolymer B-5 was prepared as in Example 1 except that n-butyl acrylate was added in an amount of 67.3 ml and benzyl acrylate was not added. Results of the evaluation are shown in Table 1.

Comparative Example 2

Production of Acrylic Block Copolymer B-6

An acrylic block copolymer B-6 was prepared as in Example 4 except that n-butyl acrylate was added in an amount of 94.3 ml and benzyl acrylate was not added. Results of the evaluation are shown in Table 1.

Comparative Example 3

Production of Acrylic Block Copolymer B-7

(1) An acrylic block copolymer 3-7 was prepared as in Example 1 except that n-butyl acrylate and benzyl acrylate were added in amounts of 60.6 ml and 5.7 ml, respectively. Results of the evaluation are shown in Table 1.

Comparative Example 4

Production of Block Copolymer B-8

(1) An acrylic block copolymer B-8 was prepared as in Example 1 except that n-butyl acrylate and benzyl acrylate were added in amounts of 26.9 ml and 34.0 ml, respectively. Results of the evaluation are shown in Table 1.

Reference Example 1

Production of Block Copolymer B-9

(1) A three-neck flask (1 L) provided with a three-way cock was degased and purged with nitrogen. Toluene (776 ml), 1,2-dimethoxyethane (46.0 ml), and a toluene solution (19.6 ml) containing isobutylbis(2,6-di-t-butyl-4-methylphenoxy)aluminum (8.8 mmol) were put into the flask at room temperature, and then sec-butyllithium (1.8 mmol) was further added thereto. A liquid mixture of methyl methacrylate (31.7 ml) and benzyl methacrylate (12.2 ml) was added to the mixture to promote a reaction at room temperature for an hour. The internal temperature of the resulting polymer solution was decreased to −15° C., and n-butyl acrylate (67.3 ml) was added dropwise thereto for an hour. Methyl methacrylate (13.2 ml) and benzyl methacrylate (5.1 ml) were subsequently added to the product, and then the reaction liquid was heated to room temperature and stirred for 5 hours. The reaction liquid was poured into a large volume of methanol, and the generated precipitate was collected to yield an acrylic block copolymer B-9. Results of the evaluation are shown in Table 1.

TABLE 1

|  | Example 1 | Example 2 | Example 3 | Example 4 | Comparative Example 1 | Comparative Example 2 | Comparative Example 3 | Comparative Example 4 | Reference Example 1 |
| --- | --- | --- | --- | --- | --- | --- | --- | --- | --- |
| Block Copolymer (B) | B-1 | B-2 | B-3 | B-4 | B-5 | B-6 | B-7 | B-8 | B-9 |
| Type of block copolymer | Triblock | Triblock | Triblock | Triblock | Triblock | Triblock | Triblock | Triblock | Triblock |
| Component of block (a) | MMA | MMA | MMA | MMA | MMA | MMA | MMA | MMA | MMA/BzMA |
| MMA/BzMA mass ratio | 100/0 | 100/0 | 100/0 | 100/0 | 100/0 | 100/0 | 100/0 | 100/0 | 70/30 |
| Component of block (b) | BA/BzA | BA/BzA | BA/BzA | BA/BzA | BA | BA | BA/BzA | BA/BzA | BA |
| BA/BzA mass ratio | 80/20 | 75/25 | 70/30 | 70/30 | 100/0 | 100/0 | 95/5 | 40/60 | 100/0 |
| Number-average molecular weight |  |  |  |  |  |  |  |  |  |
| Block (a)-1 | 21000 | 23000 | 23000 | 9800 | 24000 | 9800 | 24000 | 24000 | 23000 |
| Block (b) | 28000 | 32000 | 31000 | 44000 | 34000 | 44000 | 35000 | 37000 | 35000 |
| Block (a)-2 | 8000 | 11000 | 11000 | 9800 | 1000 | 9800 | 10000 | 11000 | 11000 |
| Molecular weight distribution of block copolymer B (Mw/Mn) | 1.13 | 1.13 | 1.14 | 1.14 | 1.12 | 1.13 | 1.12 | 1.20 | 1.18 |
| Refractive index nd | 1.493 | 1.491 | 1.490 | 1.490 | 1.479 | 1.475 | 1.496 | 1.483 | 1.490 |

BzMA: benzyl methacrylate
BA: n-butyl acrylate
BzA: benzyl acrylate

Examples 5 to 8, Comparative Examples 5 to 7, and Reference Example 2

Production of Methacrylic Compositions C-1 to 8

(1) Each of the block copolymers (B) prepared in Examples 1 to 3, Comparative Examples 1, 3, and 4, and Reference Example 1 was mixed with the methacrylic resin (A) (PARAPET GH-F commercially available from KURARAY CO., LTD.) as shown in Table 2, and the mixture was melt-kneaded with a LABO PLASTOMILL to prepare a methacrylic resin composition C.

(2) Each methacrylic resin composition C produced in the procedure (1) was thermally pressed or injection-molded into a molded article having a thickness of 3 or 4 mm. Results of evaluation of each molded article are shown in Table 2.

Comparative Example 8

The methacrylic resin (A) (PARAPET GH-F commercially available from KURARAY CO., LTD., hereinafter referred to as "methacrylic resin composition C-9") was thermally pressed into a molded article having a thickness of 3 or 4 mm. Results of evaluation of the molded article are shown in Table 2.

TABLE 2

|  | Example 5 | Example 6 | Example 7 | Example 8 | Comparative Example 5 | Comparative Example 6 | Comparative Example 7 | Reference Example 2 | Comparative Example 8 |
| --- | --- | --- | --- | --- | --- | --- | --- | --- | --- |
| Methacrylic resin composition | C-1 | C-2 | C-3 | C-4 | C-5 | C-6 | C-7 | C-8 | C-9 |
| Production of molded article | LABO PLASTOMILL→ press molding | Twin screw extrusion→ injection molding | LABO PLASTOMILL→ press molding | LABO PLASTOMILL→ press molding | LABO PLASTOMILL→ press molding | LABO PLASTOMILL→ press molding | LABO PLASTOMILL→ press molding | LABO PLASTOMILL→ press molding | press molding |
| Block Copolymer B (parts by mass) |  |  |  |  |  |  |  |  |  |
| Block copolymer B-1 | 20 |  |  |  |  |  |  |  |  |
| Block copolymer B-2 |  | 20 |  |  |  |  |  |  |  |
| Block copolymer B-3 |  |  | 20 | 12 |  |  |  |  |  |
| Block copolymer B-5 |  |  |  |  | 20 |  |  |  |  |
| Block copolymer B-7 |  |  |  |  |  | 20 |  |  |  |
| Block copolymer B-8 |  |  |  |  |  |  | 20 |  |  |
| Block copolymer B-9 |  |  |  |  |  |  |  | 20 |  |
| Matrix A (parts by mass) |  |  |  |  |  |  |  |  |  |
| PARAPET GH-F | 80 | 80 | 80 | 88 | 80 | 80 | 80 | 80 | 100 |
| Acrylate polymer block (b) content in methacrylic resin composition (parts by mass) | 10 | 10 | 10 | 6 | 10 | 10 | 10 | 10 | 0 |
| Haze [%] | 0.5 | 0.3 | 0.2 | 0.1 | 0.1 | 4.1 | 3.2 | 3.5 | 4.0 | 0.1 |
| Flexural modulus | 2500 | 2500 | 2500 | 2600 | 2700 | 2500 | 2500 | 2600 | 2500 | 3200 |
| MFR [g/10 min] | 29 | 29 | 29 | 25 | 28 | 50 | 29 | 29 | 20 |
| Charpy impact strength [KJ/m2] | 27 | 27 | 27 | 26 | 29 | 28 | 25 | 28 | 20 |

*value obtained with unnotched test specimen

Results in Table 2 demonstrate that the molded articles produced from the methacrylic resin compositions (C-1 to C-4) each composed of the methacrylic resin (A) and the block copolymer (B) exhibited excellent transparency as compared with the molded articles involving use of block copolymers with refractive indexes departing from the scope of the present invention (C-5 to C-7), the methacrylic resin (A) containing not less than 80 mass % of a methyl methacrylate unit, the block copolymer (B) containing the methyl methacrylate polymer block (b1) and the acrylate polymer block (b2) and having a refractive index of 1.485 to 1.495. These molded articles also exhibited excellent impact resistance as compared with the molded article produced only from methacrylic resin (Comparative Example 8).

Examples 9 and 10 and Comparative Examples 9 and 10

Production of Methacrylic Compositions C-10 to 13

(1) The block copolymers (B) prepared in Examples 3 and 4 and Comparative Examples 1 and 2 were mixed with the methacrylic resin (A) (PARAPET GH-S commercially available from KURARAY CO., LTD.) as shown in Table 3, and the mixtures were melt-kneaded with a LABO PLASTOMILL to prepare methacrylic resin compositions C-10 to C-13.

(2) The methacrylic resin compositions C-10 to C-13 prepared in the procedure (1) were thermally pressed into molded articles each having a thickness of 3 mm. Results of evaluation of the molded articles are shown in Table 3.

TABLE 3

|  | Example 9 | Example 10 | Comparative Example 9 | Comparative Example 10 |
|---|---|---|---|---|
| Methacrylic resin composition | C-10 | C-11 | C-12 | C-13 |
| Block copolymer B (parts by mass) | | | | |
| Block copolymer (B-3) | 50 | 31 | | |
| Block copolymer (B-4) | 20 | 13 | | |
| Block copolymer (B-5) | | | 50 | 31 |
| Block copolymer (B-6) | | | 20 | 13 |
| Matrix A (parts by mass) | | | | |
| PARAPET H-B | 30 | 56 | 30 | 56 |
| Acrylate polymer block (b) content in methacrylic resin composition (parts by mass) | 39 | 24 | 39 | 24 |
| Haze [%] | 0.9 | 1.0 | 3.0 | 10.0 |
| Tensile Elasticity [MPa] | 420 | 730 | 400 | 700 |
| Tensile elongation at break [%]* | 48 | 33 | 50 | 35 |

*Elongation rate: 300 mm/min

Results in Table 3 demonstrate that use of the compositions containing a large amount of the acrylate block (b) (Examples 9 and 10) provided high tensile elongation at break (namely, exhibiting toughness); in addition, use of such compositions provided excellent transparency as compared with use of the compositions composed of block copolymers with refractive indexes departing from the scope of the present invention (Comparative Examples 9 and 10).

INDUSTRIAL APPLICABILITY

The methacrylic resin composition of the present invention can exhibit enhanced mechanical properties such as flexibility, elasticity, impact resistance, and plasticity without degradation in optical characteristics inherent to methacrylic resins, such as transparency, and weather resistance. Furthermore, the methacrylic resin composition of the present invention also exhibits excellent moldability such as injection moldability. Hence, the methacrylic resin composition of the present invention can be utilized in a variety of applications such as illumination equipment, display devices such as signboards, optical members such as components of displays, interior appliances, building parts, electronic and electric parts, and medical equipment.

The invention claimed is:

1. A resin modifier, comprising:
a block copolymer (B) comprising from 10 to 60 mass % of a methyl methacrylate polymer block (a) and from 90 to 40 mass % of an acrylate polymer block (b),
wherein the acrylate polymer block (b) comprises from 50 to 90 mass % of an alkyl acrylate and from 50 to 10 mass % of an aromatic (meth)acrylate, and the alkyl acrylate is at least one selected from the group consisting of n-butyl acrylate and 2-ethylhexyl acrylate, and
wherein the block copolymer (B) has a refractive index of from 1.485 to 1.495,
wherein the methyl methacrylate polymer block (a) has a refractive index ranging from 1.485 to 1.495 and the acrylate polymer block (b) has a refractive index ranging from 1.485 to 1.495.

2. The resin modifier according to claim 1, wherein the aromatic (meth)acrylate is benzyl acrylate.

3. A methacrylic resin composition, comprising:
from 10 to 99 parts by mass of a methacrylic resin (A) comprising not less than 80 mass % of a methyl methacrylate unit and
from 90 to 1 part by mass of a block copolymer (B) comprising from 10 to 60 mass % of a methyl methacrylate polymer block (b1) and from 90 to 40 mass % of an acrylate polymer block (b2),
wherein the acrylate polymer block (b2) is a copolymer block comprising from 50 to 90 mass % of an alkyl acrylate and from 50 to 10 mass % of an aromatic (meth)acrylate, and the alkyl acrylate is at least one selected from the group consisting of n-butyl acrylate and 2-ethylhexyl acrylate, and
wherein the block copolymer (B) has a refractive index of from 1.485 to 1.495 and a total of (A) and (B) is 100 parts by mass,
wherein the methyl methacrylate polymer block (b1) has a refractive index ranging from 1.485 to 1.495 and the acrylate polymer block (b2) has a refractive index ranging from 1.485 to 1.495.

4. The methacrylic resin composition according to claim 3, wherein the aromatic (meth)acrylate is benzyl acrylate.

5. The methacrylic resin composition according to claim 3, wherein the methacrylic resin composition is suitable for producing a 3-mm-thick molded article having a haze of not more than 2%.

6. The methacrylic resin composition according to claim 5, wherein the methacrylic resin composition comprises the acrylate polymer block (b2) in an amount of from 5 to 20 mass % and the methacrylic resin composition exhibits an MFR of not less than 20 g/10 min at 230° C. under 37.3 N.

7. A molded article, comprising:
the methacrylic resin composition according to claim 3.

8. The molded article according to claim 7, wherein the molded article is an injection-molded article.

9. The methacrylic resin composition according to claim 3, wherein the block copolymer (B) is a diblock copolymer.

10. The methacrylic resin composition according to claim 3, wherein the block copolymer (B) is a triblock copolymer.

* * * * *